(12) United States Patent
Furomoto

(10) Patent No.: US 6,405,955 B2
(45) Date of Patent: Jun. 18, 2002

(54) FISHING LINE GUIDING MECHANISM FOR SPINNING REEL

(75) Inventor: Yoshiyuki Furomoto, Kishiwada (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/773,511

(22) Filed: Feb. 2, 2001

(30) Foreign Application Priority Data

Feb. 7, 2000 (JP) ........................................ 2000-029353

(51) Int. Cl.$^7$ ................................................ A01K 89/01
(52) U.S. Cl. ........................................................ 242/231
(58) Field of Search ................................ 242/230, 231, 242/232, 157 R

(56) References Cited

U.S. PATENT DOCUMENTS

| 3,743,207 | A | | 7/1973 | McMickle |
|---|---|---|---|---|
| 3,771,741 | A | | 11/1973 | Stein |
| 4,941,626 | A | | 7/1990 | Carlsson |
| 5,769,344 | A | * | 6/1998 | Kaneko et al. ............. 242/230 |
| 5,848,757 | A | * | 12/1998 | Amano et al. ............. 242/231 |
| 5,868,331 | A | * | 2/1999 | Shinohara et al. .......... 242/231 |
| 6,311,913 | B1 | * | 11/2001 | Yasui et al. ................ 242/231 |

* cited by examiner

Primary Examiner—Emmanuel M. Marcelo
(74) Attorney, Agent, or Firm—Shinjyu Global IP Counselors, LLP

(57) ABSTRACT

A spinning-reel fishing line guiding mechanism that readily does away with fishing line entanglement. Arm section (40a) of first bail support member (40) on bail arm (34) lies within a sphere having a radius of a first distance R1 given by the maximum distance from a reference point P—which is the juncture between stationary shaft cover (46) and bail (41)—to an outer peripheral portion of the arm section 40a. The arm section (40a) is formed such that distances R1a and R1b from the reference point P to points on its outer peripheral portion become gradually shorter than, heading outward from, the first distance R1. That is, the configuration is such that distances R1b become shorter than distances R1a.

5 Claims, 5 Drawing Sheets

FISHING LINE GUIDING MECHANISM FOR SPINNING REEL

BACKGROUND OF THE INVENTION

1. Technical Field

The present invention relates to fishing line guiding mechanisms, and in particular to a mechanism for guiding fishing line onto the spool in a spinning reel, mounted onto the ends of first and second rotor arms and pivotable between a line-guiding and a line-release position.

2. Description of Related Art

Mechanisms for guiding fishing line onto the spool are installed in spinning reels. The fishing line guiding mechanisms are fitted to the ends of a first and a second rotor arm, where they rotate together with the rotor and are installed to permit pivoting between a line-release position and a line-winding position. A typical fishing line guiding mechanism is provided with: a first and a second bail support member; a stationary shaft, one end of which is fixed to the end of the first bail support member; a stationary shaft cover fixed to the other end of the stationary shaft; a bail, one end of which is attached to the stationary shaft cover; and a line roller.

The other end of the bail is attached to the tip of the second bail support member. The one end of the bail is insert-fastened into the stationary shaft cover, wherein a step is created at the joint between the stationary shaft cover and the bail.

In winding fishing line around the spool of a spinning reel having this sort of fishing line guiding mechanism, the bail is pivoted into the line-winding position and the handle is turned. This guides the fishing line, led by the bail, into contact with the outer peripheral surface of the line roller, via the stationary shaft cover. Then, guided by the line roller, the direction of the fishing line is changed in being wound onto the spool outer periphery.

With a conventional fishing line guiding mechanism, when turning the handle, especially after casting a light lure, sometimes slackened fishing line gets caught on the step in the joint between the stationary shaft cover and the bail, and further, fishing line coiling between the joint and the outer periphery of the first bail support member gives rise to line tangles. When trying to wind on the fishing line, if the fishing line thus gets caught in the two locations (the joint between stationary shaft cover and bail, and the outer periphery of the first support member), tension between these two points increases, more strongly entangling the fishing line until at last reeling-in becomes impossible.

SUMMARY OF THE INVENTION

An object of the present invention is in enabling line entanglement in a fishing line guiding mechanism to be rid of easily.

According to a first aspect of the present invention, a fishing line guiding mechanism for a spinning reel mounted pivotably between a line-guiding position and a line-release position to ends of a first rotor arm and a second rotor arm and guiding fishing line to a spool includes: a first and a second bail support member mounted pivotably to respective ends of a first rotor arm and a second rotor arm; a stationary shaft, one end of which is fixed to the first bail support member; a stationary shaft cover spaced at an interval from the first bail support member on the other end of the stationary shaft; a line roller supported rotatively on the stationary shaft and provided with a guiding portion around whose circumferential surface the fishing line is guided; and a bail having two ends that are fixed to the second bail support member and at least one of the stationary shaft and the stationary shaft cover, the bail being curved outward in circumferential direction with respect to the spool, and guiding the fishing line over the stationary shaft cover to the line roller. The outer peripheral portion of the first bail support member lies inside a sphere whose radius is a first distance that is where the span between the outer peripheral portion and a predetermined reference point becomes the maximum. The outer peripheral portion moreover is formed into a curved surface such that the distance between it and the reference point becomes, heading outward, gradually shorter than the first distance.

In this fishing line guiding mechanism, a given reference point is determined as the position where an entanglement may occur, a sphere is defined that has a radius of a maximum distance between this reference point and the outer peripheral portion of the first bail support member, and the outer peripheral portion of the first bail support member lies on and within this sphere. Moreover, the outer peripheral portion of the first bail support member is formed into a curved surface such that the distance between the reference point and the outer peripheral portion gradually becomes shorter in an outward orientation that enables fishing line guiding. For example a line tangle might arise at the predetermined reference point and the fishing line get caught on the outer peripheral portion of the first bail support member. Herein, the line-winding operation will shift the position on the first bail support member outer periphery where the fishing line is caught outward, with the reference point as center, finally bringing it off and at the same time getting rid of the line tangle at the reference point. The line tangle is therefore easily gotten rid of.

According to a second aspect of the present invention, in a fishing line guiding mechanism as in the first aspect, the reference point is located on an inner peripheral portion of the first bail support member. With this configuration, it is possible to form the outer peripheral portion of the first bail support member as an arcuate or smoothly convex shape with the reference point at its center, so that the fishing line does not get caught so easily by the outer peripheral portion of the first bail support member.

According to a third aspect of the present invention, in a fishing line guiding mechanism as in the first or second aspect, the reference point is a juncture between the stationary shaft cover and the bail. With this configuration, the reference point is set to the juncture between the stationary shaft cover and the bail where the fishing line tends to become entangled, so that entanglements at this reference point can be easily resolved.

According to a fourth aspect of the present invention, in a fishing line guiding mechanism as in any of the first to third aspects, a lateral portion of the first bail support member lies in a sphere having a radius of a second distance given by the maximum distance between the lateral portion and the reference point, and wherein the lateral portion forms a curved surface such that the distance between the lateral portion and the reference point gradually becomes shorter heading outward than the second distance. With this configuration, the fishing line can be prevented from getting caught at the lateral portion of the first bail support member, in the same manner as at the outer peripheral portion of the first bail support member.

According to a fifth aspect of the present invention, in a fishing line guiding mechanism as in any of the first to fourth aspects, the second distance is shorter than the first distance.

With this configuration, if the fishing line can be prevented from getting caught at the outer peripheral portion of the first bail support member, then entanglement can be prevented in a similar manner also at the later portion of the first bail support member, whose maximum distance is shorter.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration and Configuration of the Reel Unit

Figure 1:
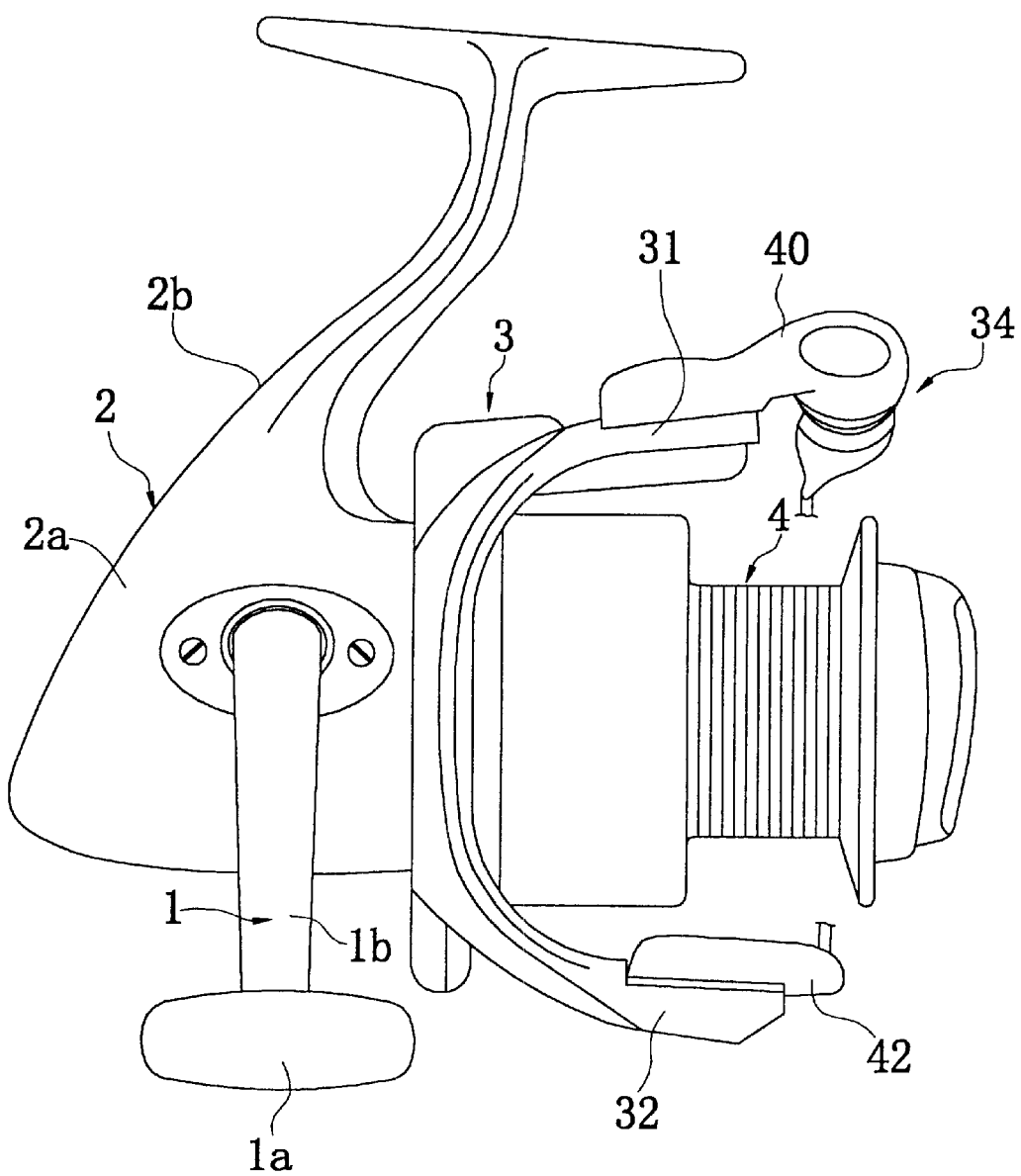
FIG. 1 is a right-side view of a spinning reel to which an embodiment of the present invention is applied.
Figure 2:
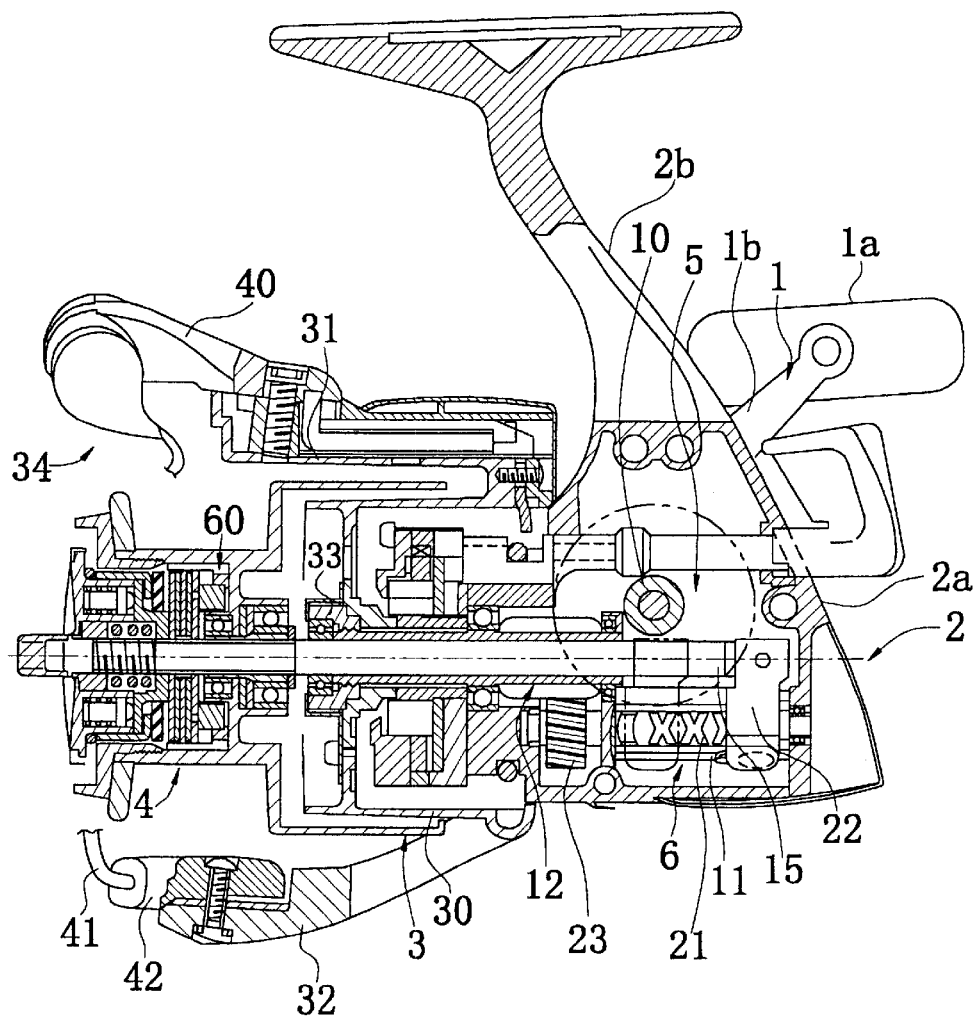
FIG. 2 is a partly in section, left-side view of the FIG. 1 spinning reel, with the bail depicted fragmentarily.

As shown in FIGS. 1 and 2, a spinning reel in accordance with an embodiment of the present invention includes a handle 1, a reel unit 2 rotatively supporting the handle 1, a rotor 3, and a spool 4. The rotor 3 is rotatively supported at the front of the reel unit 2. The fishing line is wound around the outer peripheral surface of the spool 4, which is disposed at the front of the rotor 3 and can be shifted back and forth.

The handle 1 includes a T-shaped grip portion 1a and an L-shaped crank arm 1b rotatively attached to the tip of the grip portion 1a.

As shown in FIGS. 1 and 2, the reel unit 2 includes a reel body 2a having an opening on its side and a T-shaped rod attachment leg 2b extending diagonally upward to the front and formed unitarily with the reel body 2a. As shown in FIG. 2, the reel body 2a has a mechanism-accommodating space inside, which accommodates a rotor driving mechanism 5 and an oscillation mechanism 6. The rotor driving mechanism 5 transmits rotation of the handle 1 to rotate the rotor 3. The oscillating mechanism 6 shuttles the spool 4 back and forth to wind on the fishing line uniformly.

As shown in FIGS. 1 and 2, the spool 4 is disposed between a first rotor arm 31 and a second rotor arm 32 of the rotor 3, which will be explained below. A drag mechanism 60 (see FIG. 2) links the center of the spool 4 to the front end of a spool shaft 15.

As shown in FIG. 2, the rotor driving mechanism 5 includes a handle shaft 10, a master gear 11 and a pinion gear 12. The master gear 11 rotates together with the handle shaft 10, on which the handle 1 is mounted non-rotatively. The pinion gear 12 meshes with the master gear 11. Both ends of the handle shaft 10 are supported rotatively in the reel unit 2 on bearings. Female threaded portions of different thread direction and diameter are formed in either end of the handle shaft 10, and the handle 1 can be fitted non-rotatively into either female threaded portion.

The pinion gear 12 is tubular. Its front portion penetrates the center of the rotor 3, and is fixed with a nut 33 to the rotor 3. The middle and the rear end of the pinion gear 12 are rotatively supported by bearings in the reel unit 2.

The oscillating mechanism 6 shifts the spool 4 back and forth. As shown in FIG. 2, the oscillating mechanism 6 includes a threaded shaft 21, a slider 22, and an intermediate gear 23. The threaded shaft 21 is arranged substantially below and in parallel with the spool shaft 15. The slider 22 moves back and forth along the threaded shaft 21, to the front end of which the intermediate gear 23 is fixed. The rear end of the spool shaft 15 is fixed non-rotatively to the slider 22. The intermediate gear 23 meshes with the pinion gear 12.

Configuration of the Rotor

As shown in FIG. 2, the rotor 3 includes a barrel portion 30 fixed to the pinion gear 12, a first rotor arm 31 and a second rotor arm 32, which are disposed in opposition to one another at the sides of the barrel portion 30, and a bail arm 34 serving as a fishing line guiding mechanism for guiding fishing line to the spool 4. The barrel portion 30 and the first and second rotor arms 31 and 32 can be made, for example, of an aluminum alloy, and are formed unitarily. The front and center portions of the barrel portion 30 are fixed non-rotatively to the front portion of the pinion gear 12 with the nut 33, as mentioned above.

Configuration of the Bail Arm

Figure 3:
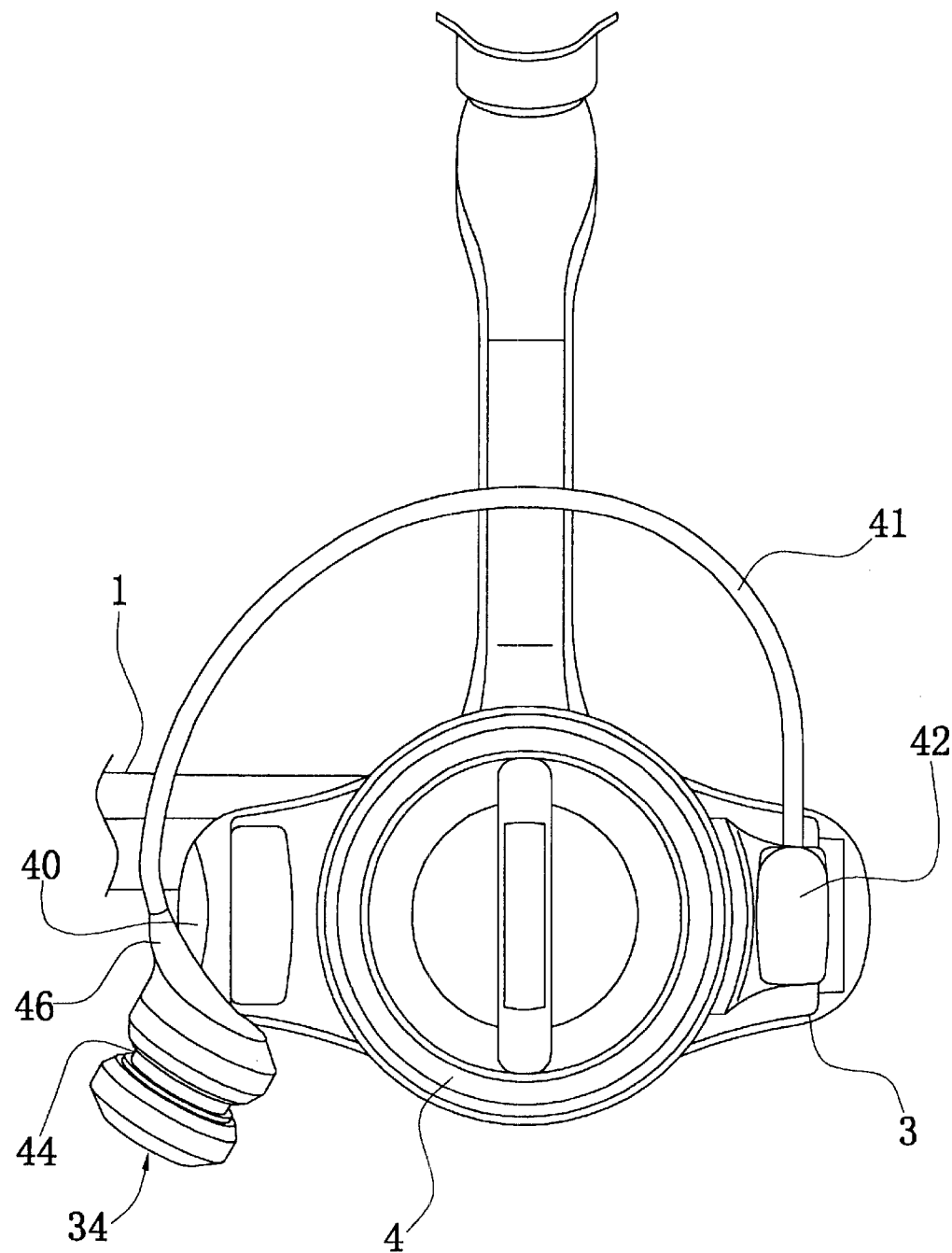
FIG. 3 is a front elevational view of the FIG. 1 spinning reel, with the handle depicted fragmentarily.
Figure 5:
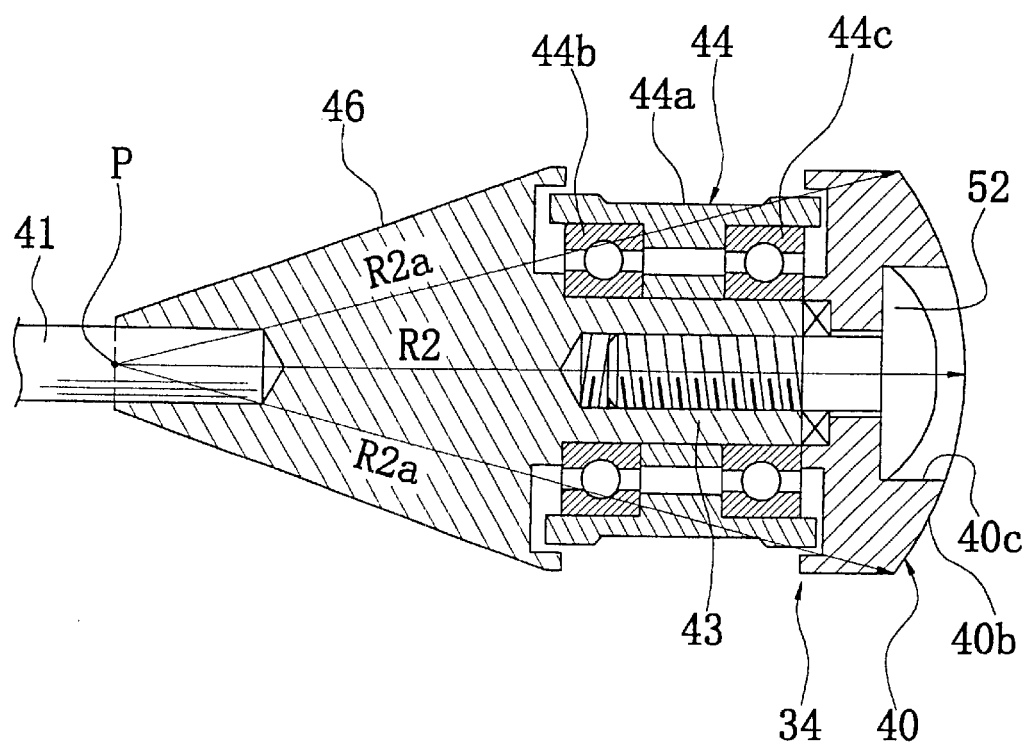
FIG. 5 is a section view of the bail arm main portion.

The bail arm 34 is disposed at the tips of the first rotor arm 31 and the second rotor arm 32, and is pivotable between a line-guiding position and a line-release position. The bail arm 34 includes a first bail support member 40 and a second bail support member 42 mounted pivotably on the tips of the first rotor arm 31 and the second rotor arm 32. The first bail support member 40 is mounted pivotably to the outer side of the first rotor arm 31, whereas the second bail support member 42 is mounted to the inner side of the second rotor arm 32. As shown in FIGS. 3 and 5, the bail arm 34 includes a bail 41, a stationary shaft 43 (see FIG. 5), a line roller 44, and a stationary shaft cover 46. The bail 41 connects the first bail support member 40 and the second bail support member 42. The leading end of the stationary shaft 43 is fastened to the first bail support member 40. The line roller 44 is supported on the stationary shaft 43, which is covered by the stationary shaft cover 46.

Figure 4:
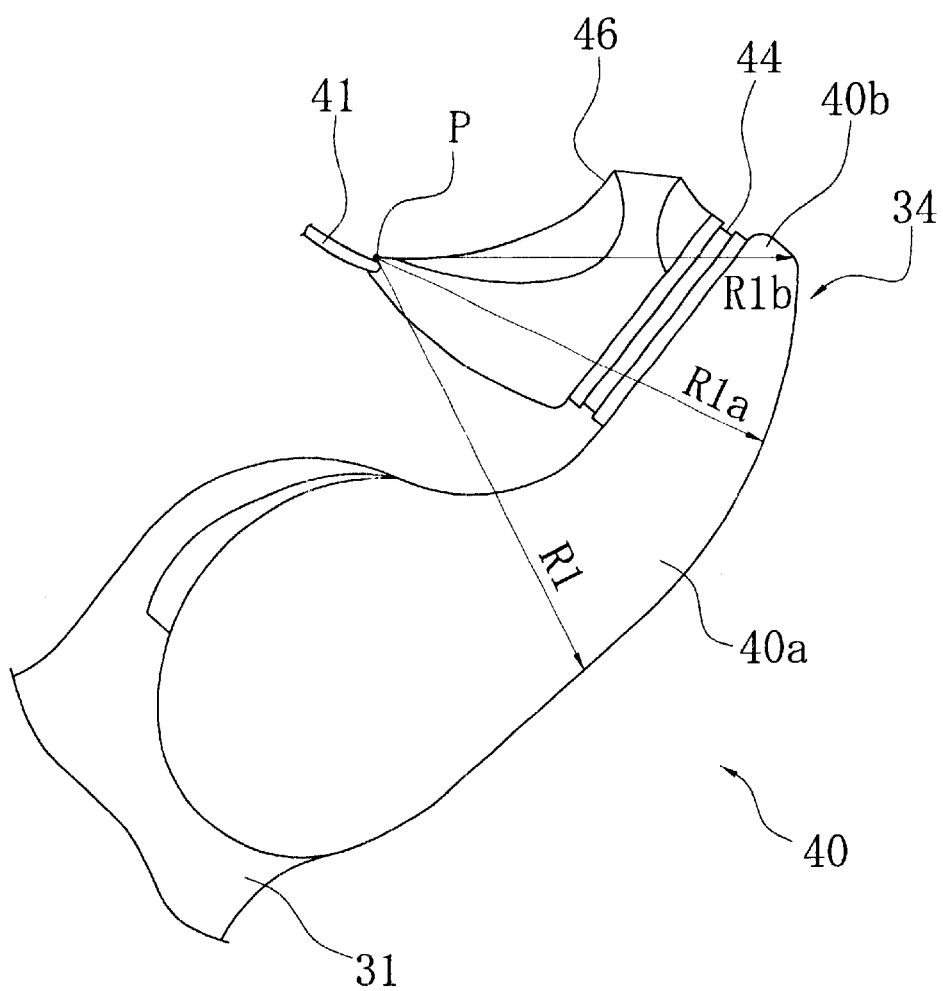
FIG. 4 is a fragmentary oblique view of the bail arm main portion.

As shown in FIGS. 4 and 5, the first bail support member 40 includes an arm section 40a, mounted pivotably on the first rotor arm 31, and a ring-shaped mounting portion 40b formed unitarily with the arm section 40a. The mounting portion 40b is provided with a stepped through hole 40c (see FIG. 5), and a fixing bolt 52 for fixing the stationary shaft 43 to the first bail support member 40 is passed through the through hole 40c.

As shown in FIG. 4 the arm section 40a of the first bail support member 40 lies in a sphere having a radius of a first distance R1 given by the maximum span from the reference point P, which is the juncture (where a step arises) between the stationary shaft cover 46 and the bail 41, to the outer peripheral portion of the arm section 40a. The arm portion 40a is formed such that distances R1a, R1b from the reference point P to points on the outer periphery of the arm portion 40b become gradually shorter than the first distance R1, heading outward therefrom. This means that the arm portion 40a is formed such that distance R1b is shorter than the distance R1a. Furthermore, the arm section 40a lies in a sphere having a radius of a second distance R2 given by the maximum span from the reference point P the arm section 40a lateral part (outer peripheral part in the overhead section), as shown in FIG. 5. Distances R2a from the reference point P to the arm section 40a lateral part become gradually shorter than, heading outward from, the second distance R2. Incidentally, the second distance R2 is the same length as the first distance R1.

As shown in FIG. 3, the bail 41 is a wire-formed member that is caulk-fastened at either end to the second bail support member 42 and the stationary shaft cover 46, and curves outward in circumferential direction around the spool 4. When the bail arm 34 has returned from the line-release position to the line-guiding position, the bail 41 guides the fishing line over the stationary shaft cover 46 to the line roller 44.

As shown in FIG. 5, the stationary shaft 43 is formed in a cutting process unitarily with the stationary shaft cover 46. The stationary shaft 43 extends from a base, that it shares with the stationary shaft cover 46, toward the first bail support member 40, and its front end is fixed by the fixing bolt 52.

As shown in FIG. 5, the line roller 44 includes a cylindrical guiding portion 44a whose peripheral surface is provided with a groove for guiding fishing line, and two ball bearings 44b and 44c arranged at an axial spacing to the inner peripheral side of the guide portion 44a. The stationary shaft 43 rotatively supports the guide portion 44a via the two ball bearings 44b and 44c.

The stationary shaft cover 46 is provided at the base end of the stationary shaft 43, spaced at an interval from the mounting portion 40b of the first bail support member 40. The stationary shaft cover 46 is a roughly cone-shaped member whose vertex deviates from the center; the vertex, taking the center of the stationary shaft 43 as a reference, is oriented toward the rear of the-reel, and in the radially outward direction of the spool 4. The bail 41 is caulk-fastened to bias from the vertex of the stationary shaft cover 46 toward the side where the fishing line is guided.

Function and Operation of the Reel

With this spinning reel, the bail arm 34 falls into line-release position when line is let out, for example when casting. This causes the first bail support member 40 and the second bail support member 42 to pivot. As a result, the fishing line plays out from the front side of the spool 4, due to the weight of the bait.

When winding the line, the bail arm 34 is returned to a winding position. This is achieved automatically with a bail flipping mechanism (not shown in the drawings) when the handle 1 is rotated in the direction taking up line. The torque of the handle 1 is transmitted over the handle shaft 10 and the master gear 11 to the pinion gear 12. The torque transmitted to the pinion gear 12 is transmitted from the front end of the pinion gear 12 to the rotor 3, and by the intermediate gear 23 meshing with the pinion gear 12 to the oscillation mechanism 6. As a result, the rotor 3 rotates in the direction winding up line, and the spool 4 shifts back and forth.

The fishing line contacting the bail 41 when starting to wind up line is guided by the bail 41 to the stationary shaft cover 46. The fishing line guided by the stationary shaft cover 46 is guided by the line roller 44, its direction is changed by the line roller 44, and it is wound around the spool 4.

In this spinning reel, the juncture between the stationary shaft cover 46 and the bail 41, where the fishing line tends to get entangled, is taken as the reference point P, and the arm section 40a of the first bail support member 40 is arranged in the spheres with the radii of the first distance R1 given by the maximum span from the reference point P to the outer peripheral portion of the arm section 40a, and the second distance R2 given by the maximum distance from the reference point P to the lateral portion of the arm section 40a. The distances R1a, R1b and R2a from the reference point P to points on the outer peripheral portion and lateral portion of the arm section 40a are shorter than the first distance R1 and second distance R2, and gradually become shorter heading outward. Therefore, when line becomes entangled at the reference point P and is caught at the outer peripheral portion or the lateral portion of the arm section 40a, the location where the line is caught at the outer peripheral portion or the lateral portion of the arm section 40a can be shifted outward around the reference point P by winding up line, which eventually removes the fishing line and at the same time solves the entanglement at the reference point P. Consequently, the entanglement can be resolved easily by winding up line.

Other Embodiments (a) The above embodiment has been described taking an example of a front drag spinning reel, but the present invention can also-be applied to any type of spinning reel, such as rear drag spinning reels, spinning reels without drag control, lever drag spinning reels, etc.

(b) In the above embodiment, the stationary shaft 43 is formed unitarily with the stationary shaft cover 46, but it is also possible to provide the stationary shaft 43 and the stationary shaft cover 46 as separate elements. Moreover, the bail 41 is fixed to the stationary shaft cover 46, but there is no limitation to this, and the bail 41 can also be fixed to the stationary shaft 43.

(c) In the above embodiment, the second distance R2 was the same as the first distance R1, but it is also possible to make the second distance R2 shorter than the first distance R1. It is also possible to make the distances R1a, R1b and R2a equal to the first distance R1 and the second distance R2, so that the outer peripheral portion and the lateral portion of the arm section 40a are arranged on the same spherical surface.

With the present invention, the outer peripheral portion of the first bail support member lies in a sphere having a radius given by the maximum distance between the outer peripheral portion and a predetermined reference point. Furthermore, the shape of the outer peripheral portion of the first bail support member is such that the distance between the outer peripheral portion and the reference point gradually becomes shorter in outward direction, starting at a maximum distance. Therefore, the location where fishing line is caught at the outer peripheral portion of the first bail support portion can be shifted outward around the reference point simply by winding up line, which eventually removes the fishing line and at the same time solves the entanglement at the reference point. Consequently, the entanglement can be resolved easily by winding up line.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. For a spinning reel, a fishing line guiding mechanism fitted to leading ends of first and second rotor arms to allow pivoting between a line-guiding position and a line-release position and for guiding a fishing line onto the spinning reel spool, the spinning reel fishing line guiding mechanism comprising:

first and second bail support members respective fitted pivotably to the leading ends of the first and second rotor arms;

a stationary shaft fixed at one end to said first bail support member;

a stationary shaft cover provided on the other end of said stationary shaft, spaced at an interval from said first bail support member;

a line roller supported rotatively on said stationary shaft and formed with a guiding portion whose circumferential surface guides the fishing line; and a bail disposed curving outward in the spool circumferential direction, fixed at either end to the second bail support member and to at least one of either said stationary shaft and said stationary shaft cover, for guiding the fishing line onto said line roller via said stationary shaft cover; wherein an outer peripheral portion of said first bail support member lies inside a sphere whose radius is given by a first distance where span between the outer peripheral portion and a predetermined reference point becomes the maximum, and said outer peripheral portion is formed into a curved surface such that the distance between said outer peripheral portion and said reference point becomes, heading outward, gradually smaller than the first distance.

2. A fishing line guiding mechanism for a spinning reel as set forth in claim 1, wherein said reference point lies to the inner peripheral side of the first bail support member.

3. A fishing line guiding mechanism for a spinning reel as set forth in claim 1, wherein said reference point is a juncture between said stationary shaft cover and said bail.

4. A fishing line guiding mechanism for a spinning reel as set forth in claim 1, wherein:

a lateral portion of the first bail support member lies inside a sphere whose radius is given by a second distance where span between said lateral portion and said reference point becomes the maximum; and said lateral portion is formed into curved surface such that the distance between said lateral portion and said reference point becomes, heading outward, gradually smaller than the second distance.

5. A fishing line guiding mechanism for a spinning reel as set forth in claim 1, wherein the second distance is shorter than the first distance.

* * * * *